United States Patent [19]

Martin

[11] Patent Number: 5,012,406
[45] Date of Patent: Apr. 30, 1991

[54] LINE OF POWER INTERRUPTION IN PREDETERMINED AREA OF INTERNAL PERMANENT MEMORY

[75] Inventor: Pierre J. Martin, Caracas, Venezuela

[73] Assignee: Power Card Supply, Caracas, Venezuela

[21] Appl. No.: 183,674

[22] Filed: Apr. 19, 1988

[51] Int. Cl.$^5$ ............................................. G06F 1/30
[52] U.S. Cl. ................................ 364/200; 364/273.4; 364/260.2; 364/248.1; 371/66
[58] Field of Search ......................................... 371/66; 364/200 MS File, 900 MS File; 307/66; 365/228

[56] References Cited

U.S. PATENT DOCUMENTS

| | | | |
|---|---|---|---|
| 3,959,778 | 5/1976 | Brette | 340/172.5 |
| 4,143,283 | 3/1979 | Graf et al. | 307/66 |
| 4,327,410 | 4/1982 | Patel et al. | 364/200 |
| 4,335,447 | 6/1982 | Jerrim | 364/900 |
| 4,451,742 | 5/1984 | Aswell | 307/66 |
| 4,458,307 | 7/1984 | McAnlis et al. | 364/200 |
| 4,611,289 | 9/1986 | Coppola | 364/492 |
| 4,757,505 | 7/1988 | Marrington et al. | 371/66 |
| 4,763,333 | 8/1988 | Byrd | 371/66 |
| 4,782,241 | 11/1988 | Baker et al. | 307/66 |
| 4,907,150 | 3/1990 | Arroyo et al. | 364/200 |
| 4,908,793 | 3/1990 | Yamagata et al. | 365/228 X |
| 4,959,774 | 9/1990 | Davis | 364/200 |

FOREIGN PATENT DOCUMENTS

60-215263 10/1985 Japan ........................ 365/228

Primary Examiner—Thomas C. Lee

[57] ABSTRACT

The orderly powering down of a computer, in the event of a power interruption, is accomplished with a capability that senses the power interruption and supplies an independent source of power, together with and for the duration of a special austere orderly powering down series of instructions to the computer that terminates external interfaces and places all work in process in permanent memory with an indication that the interruption took place. The independent source of power and the sensing portions of the capability may be mounted in a subassembly compatible with the structure of the particular computer involved and the source of instructions may be placed in the computer memory.

10 Claims, 10 Drawing Sheets

NC.EXE ROM
FIG.9

FIG. 10

NC GEN.EXR
FIG.10a

NCT ST. EXE
FIG.11

LINE OF POWER INTERRUPTION IN PREDETERMINED AREA OF INTERNAL PERMANENT MEMORY

The invention is directed to the orderly powering down of a computer in the event of a power interruption.

BACKGROUND OF THE INVENTION

As computers become used in more diversified locations and the processing becomes more complex, the frequency and effect of interruptions in the source of power to the computer can cause a situation wherein a substantial amount of work may be lost.

Computers in general are provided with a permanent storage, and with quantities of intermediate or buffer storage, all interfacing with the user mostly through a display. As the work in process proceeds, material is moved from one location to another under direction of the user through an operating system in the computer.

In the event of an interruption of power, the portion of the work in process that has not at that time been placed in the permanent storage is generally lost. Further, in some computers internal systems may be affected by a disorderly termination of operations and some external computer interfaces require formal sign-off instructions.

SUMMARY OF THE INVENTION

The invention is a capability that will supply an independent source of energy to a computer in the event of a power interruption for a time which permits the generation of a special series of signals to which the computer can respond, that produce an orderly powering down of the operation at that time by taking any work that is in process and placing that work in the permanent memory with an indication that will alert a subsequent operator that the interruption has taken place or by generating any other series of signals required by the particular situation.

The invention provides its own source of power and sensing circuitry on a subassembly of the particular computer together with the capability of delivering the appropriate signals for the orderly powering down of the computer without losing work in process, interfering with other systems in the computer or leaving an unterminated external interface connection.

BRIEF DESCRIPTION OF THE DRAWINGS

FIGS. 8 to 11 are generalized functional flow charts illustrating software routines for managing the providing of orderly powering down instructions wherein:

DETAILED DESCRIPTION OF THE PREFERRED EMBODIMENT

Figure 1:
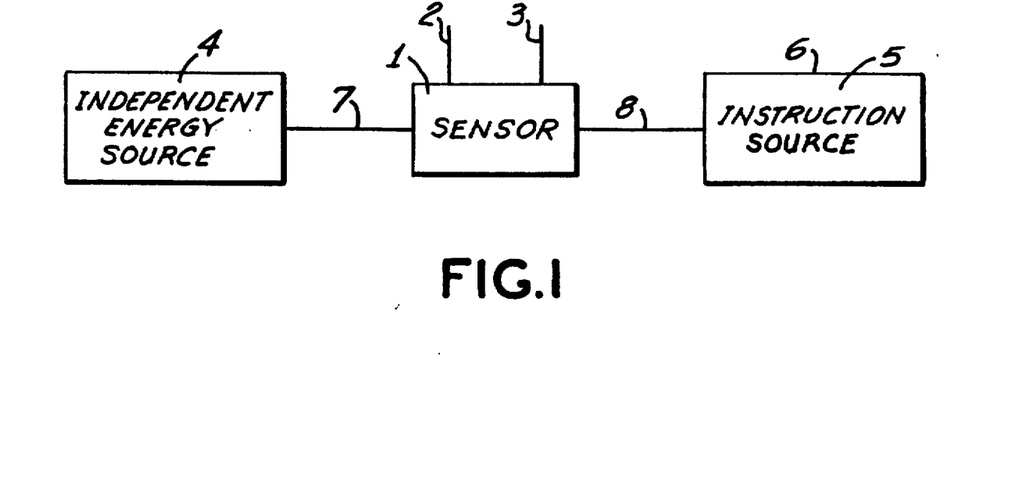
FIG. 1 is a schematic block diagram of the functions provided by the invention.

Referring to FIG. 1 in the schematic block diagram the invention in a sensor function 1 monitors the power supplied on the power busses of the computer, two of which are shown as elements 2 and 3 and when there is an indication that power has fallen below a level lower than that within the tolerance of the computer, provides power from a source 4 which is independent of the main power of the computer. The source 4 maintains the power level required for computer operation on the busses 2 and 3 long enough to permit orderly powering down. Simultaneously, in an instruction source element 5, a special series of instructions compatible with the orderly powering down of the particular computer operation in process in the computer are delivered through a port 6. The internal communication between the elements 1, 4 and 5 of the invention are maintained by channels 7 and 8.

The instruction set provided is special in that it involves only the instructions required to terminate operation in an orderly and recoverable manner.

In usual operations there are interaction operations with the user interface that operate to build into the system an element of "user friendliness". For example, where work in progress is to replace a piece of work in permanent memory, the system would, through the user interface require the user to verify that it is really desired that the existing piece of work be overwritten by the work in process.

In accordance with the invention the special instruction set is austere with respect to that which is to be accomplished in that only essential instructions are involved. The orderly powering down thus becomes possible within the power duration capacity of an individual power supply that can be mounted on a subassembly.

In accordance with the invention, when the main power is interrupted, the invention senses this fact by monitoring one of the busses that supply power in the system in the sensor 1 and through channel 7 switches in the independent power supply 4 to maintain the proper level.

The sensor 1 also supplies information through channel 8 to the special instruction source 5 which could be located in the same subassembly structure as elements 1 and 4, but preferably may be a program routine that is resident among the programs of the computer. The special instruction routine sends signals through port 6 to power down the system in an orderly manner.

The special instruction set for orderly powering down will vary depending on the complexity of the operation being performed and the complexity of the apparatus to which the invention is being applied.

In a simple case of mere signoff of a computer from a network, where all work in process is in the central processor, a transfer to permanent memory signal and termination signals to the network, and to the operating system if needed, are all that would be required.

In a more complex case, where there are multiple auxiliary drives, with calculation being performed and stored on one auxiliary drive, to be entered on a spread sheet type of data arrangement stored on another auxiliary drive, all for subsequent updating of data in permanent memory; it will be apparent that instructions for collecting and assembling the data on the auxiliary drives and then transferring the assembled total to the permanent memory, will be required.

The special instruction set in accordance with the invention uses a minimum of instructions, without user interface interaction, so that the operation can be accomplished in the power duration of the independent power supply.

The instructions operate to sign the system off any outside interface or take any work in process from various registers and buffers and place it in the permanent memory along with a flag or signal source which indicates that the power interruption has taken place. When this is complete or at the end of a fixed time, or should power be reestablished, a signal is sent back to the sensor 1 to disconnect the independent power supply 4.

In the event that the power level is reestablished on the busses 2 and 3, there is a signal through port 6 to the sensor that the conditions in the computer are such that external power is not needed, the sensor 1 directs the use of power from the busses to charge the independent power supply 4 and to maintain the system in the ready-condition for the next time the power level at busses 2 and 3 drop below that which is satisfactory.

The sensor 1 also is equipped with timing apparatus so that power supplied from the independent power supply 4 is not maintained longer than is needed in order to orderly power down the system.

Figure 2:
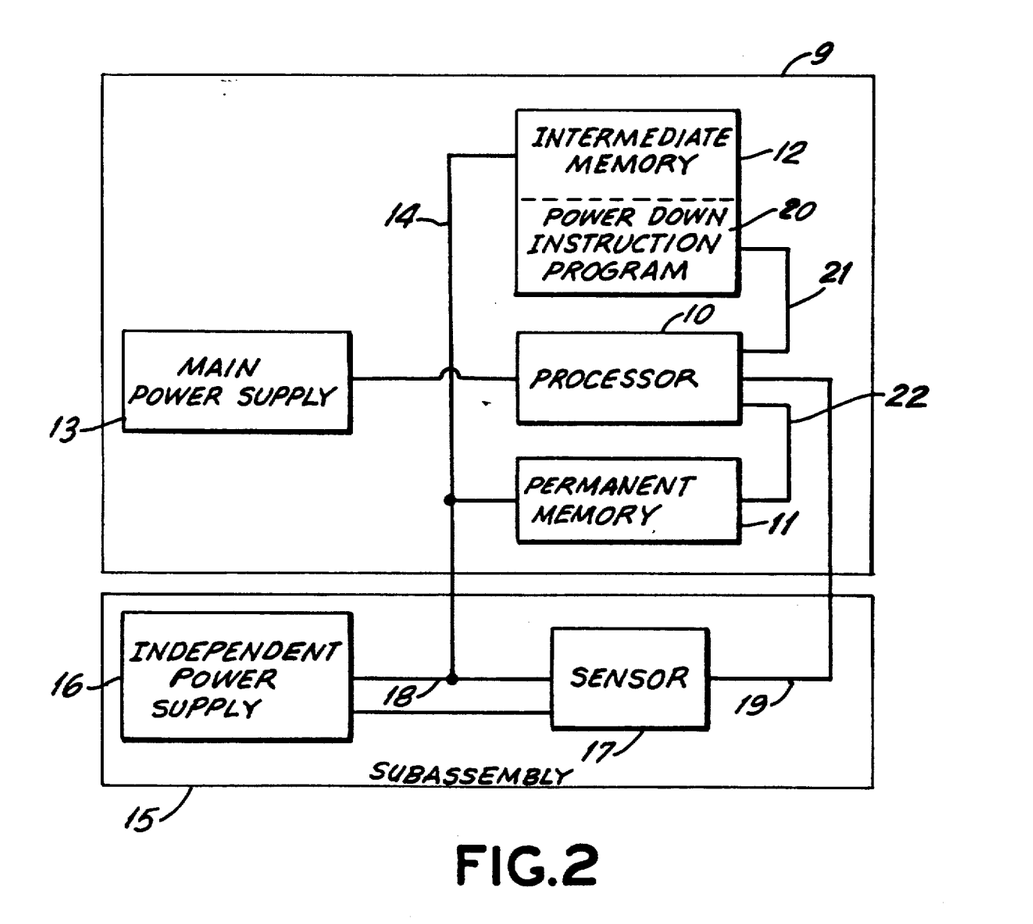
FIG. 2 is a schematic block diagram of a computer showing a portion of the invention as a subassembly thereof.

Referring next to FIG. 2, a schematic block diagram is shown of a typical computer illustrating the invention arranged with the independent power supply 4 and the sensor 1 as a separate subassembly of the computer and the instruction source 5 as a resident power down instruction program in the computer.

In FIG. 2, as a typical configuration, the computer 9 will have a processor 10, a permanent memory 11, such as a hard disc, and an intermediate, usually high speed semiconductor type memory 12. Larger configurations may also have one or a plurality of auxiliary disc drives serving as more intermediate memory.

The information processing storage and transferring are managed under a resident operating system program. One of the more frequently used of these systems is known as the Disc Operating System and is called by the acronym DOS. Recently in the art, there have appeared operating systems that use a technique called "shells" to keep dynamic track of multiple tasks. The Xenix and Unix operating systems are examples of this type. The invention provides the minimum orderly powering down instructions regardless of the type of operating system.

In most configurations, the processor 10 is the region where most of the work takes place, while the work in process is generally stored in the short-term or high speed memory 12 with periodic transfers to the permanent memory 11.

The processor 10 is generally a circuit of fairly high speed interconnected components which perform comparison and computation type functions. A main power supply 13 is generally connected to an outside power source, and that power supply through a group of busses shown as element 14 supplies the power levels required for each of the elements 10, 11, and 12.

The sensor 1 and independent power source 4 portion of the invention is shoWn as a subassembly 15 of the overall computer 9, such as a card or pluggable unit.

On the subassembly 15, the independent power source is a non-interruptable, self-sufficient power supply 16 such as a series of batteries. The sensor is a unit 17 which, through channel 18, is connected to buss 14 of the computer 9. It monitors the power level on the buss 14 and switches in the independent power supply 16 in the event of an interruption in the main power.

The sensor 1 also sends instructions through channel 19 to the processor 10 to call the special orderly powering down instructions through channel 21. The special orderly powering down instructions are in a program 20 shown as occupying a partitioned portion of the intermediate memory 12. Such program would usually be loaded at each power up operation. It will be apparent, however, that with the computer flexibility the special orderly powering down instruction program 20 can be located anywhere reachable in a short period.

It will further be apparent to one skilled in the art in connection with FIG. 2 that element 16 performs the function of element 4 of FIG. 1. Element 17 performs the function of element 1 of FIG. 1 and that the special orderly powering down instruction generating capability of element 5 of FIG. 1 is arranged to be a resident program in the intermediate memory 12 with a partitioning thereof labelled element 20.

In FIG. 2, in accordance with the invention, a non-interruptable self-sufficient power supply 16 is provided with a sensor 17 that determines that there is an interruption of power from the main supply 13 to the buss 14. The power supply 16 is then connected to the buss 14 to immediately restore sufficient power for the orderly powering down so that instructions from the resident program 20 operate to transfer work in process through channel 22 into the permanent storage 11 providing, along with the transfer, a data flag that indicates that the power interruption event has happened, and then, the independent power supply 16 is disconnected.

The independent power supply 16 need only hold the logic and drive current levels in the buss 14 sufficient to maintain operation of the computer long enough for the special orderly powering down instructions to be executed.

As an illustration of what would be required, assume a word processing operation is taking place at the time of a power interruption. There will be located in the permanent memory 11, a quantity of text that is to be changed. The material undergoing the change is located in the intermediate memory 12. At the time of a power failure, it will be necessary to take any material located in the intermediate memory in 12 and write it into and probably over the text that is already present in the permanent memory 11, and then to exit.

In accordance with the invention the special orderly powering down instructions would thus involve in the case of this example just two steps, whereas, under ordinary circumstances, involving user interfacing, the user would employ a keystroke labelled escape or exit. This keystroke in essence tells the computer you want to do something else. The computer then displays a menu from which is selected, by another keystroke, the operation to transfer the material that presently is in the intermediate memory 12 to the permanent memory 11. The display menu also indicates the need for an address into which the material in the intermediate memory 12 is to be transferred. The address is usually supplied by a further series of keystrokes. In the case of this example, the work in process in the intermediate memory 12 is to be written over the material in the permanent memory 11 so that the address keystrokes are those of the text material in the permanent memory 11. The user friendliness aspect of the operating system of the computer then usually displays the question "are you sure you want to write over the material at that address in the permanent memory 11". The reply is still another keystroke which communicates "yes, do it". The computer upon completion has now transferred to permanent storage. There is one other keystroke "exit" after which the power can be turned off.

It will be apparent to one skilled in the art that in contrast to what is usually done when user interaction is involved, with this invention, the special orderly powering down instructions are austere in that they usually eliminate user interaction and user friendliness type error prevention operations and go straight to, and only involve the essential operations to orderly terminate the operation being performed so that the austere special powering down instructions make possible the ability to maintain the computer in operation long enough for orderly powering down within the energy content of a battery that can be mounted in a standard subassembly.

It will further be apparent to one skilled in the art that another advantage of the assembly of FIG. 2, wherein the generation of the special orderly power down instructions is in a small program resident in the intermediate storage, is that that program can be loaded during each powering up or "boot" of the system.

It will still further be apparent to one skilled in the art that the source of the special orderly powering down instructions can be located in either the permanent memory or the intermediate memory, or, on a separate source in a subassembly. It is essential, however, that the sensor know precisely where to get the austere series of orderly powering down instructions, and that they be reachable in a compatible time frame with the duration of power available.

Figure 3:
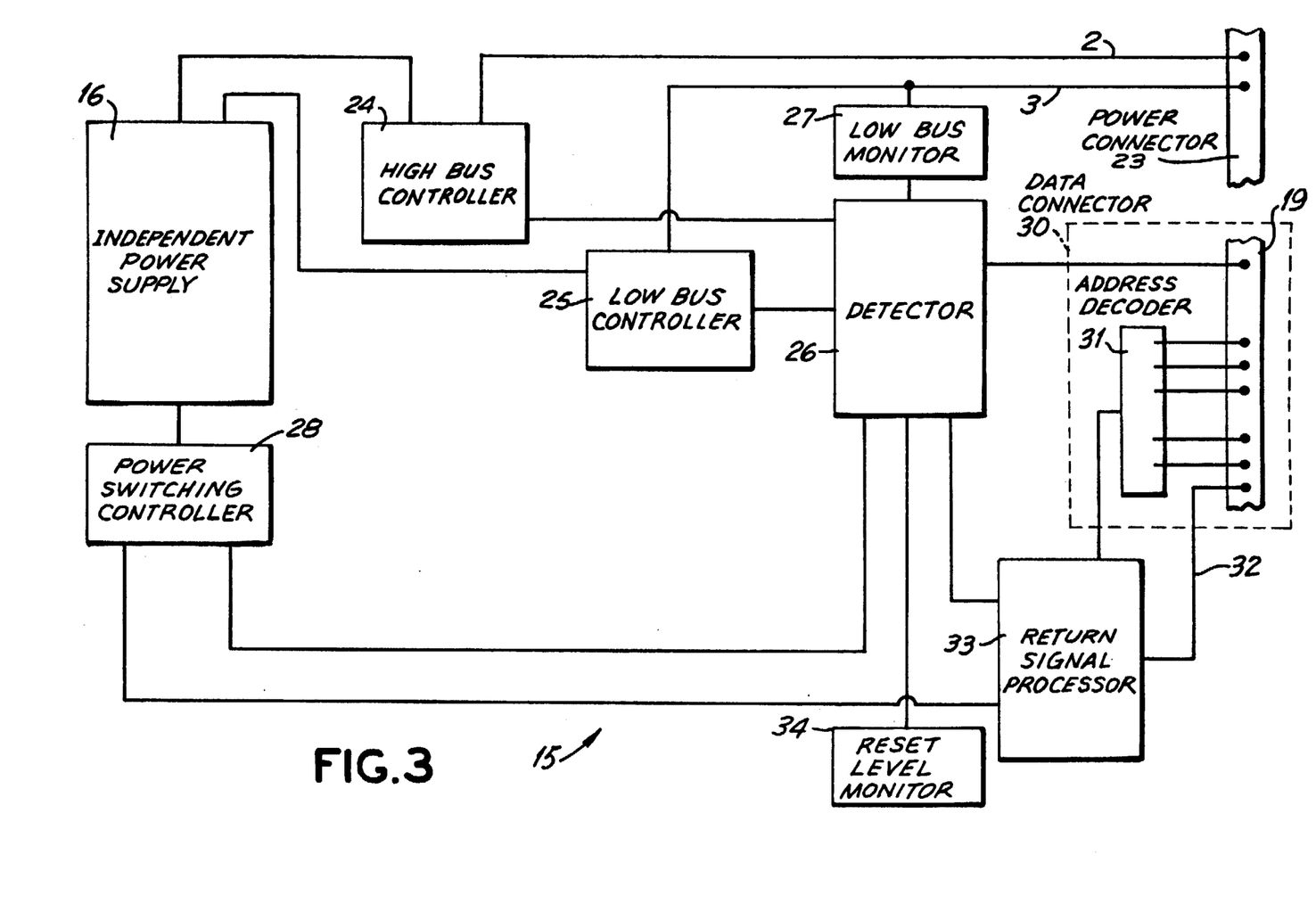
FIG. 3 is a schematic block diagram of a computer subassembly having the power and sensor portions of the capability of the invention positioned thereon.

Referring next to FIG. 3, a schematic block diagram is provided illustrating the functions performed in the subassembly 15 of FIG. 2. In FIG. 3 there are shown at a power connector 23 a high voltage level power bus 2 and a low voltage level power bus 3 that correspond to the schematic bus 14 of FIG. 2. The independent power supply 16 is connected to the high level bus 2 through a controller 24 and to the low level bus 3 through a controller 25. The controllers 24 and 25, in turn, are connected to a detector 26. The detector 26, as one of the functions, receives a signal from a low bus monitor 27 which monitors the level in the low bus 3 for the presence of a drop in level that is large enough to indicate a power interruption, and thereupon delivers a signal to each of controllers 24 and 25 and to a power switching controller 28 to turn on the independent power supply. The detector 26 as another of its functions, generates a signal on conductor 29 to an output communicating with channel 19 to the processor 10 in FIG. 2 through the data connector 30 indicating the presence of the power interruption which, in turn, operates to call the program with the special orderly powering down instructions. The data connector interface 30 also includes an address decoder 31 capable of decoding the particular address for the particular port for the particular machine with which the subassembly 15 is to be used.

A return signal from channel 19 received at the data connector 30 on conductor 32 is delivered, in conjunction with the decoded address from element 31, to the return signal processor 33 indicating any one or all of completion of execution of the special instructions or restoration of power. In turn, the return signal processor 33 delivers signals that, under control of a reset level monitor 34 resets the circuits in the subassembly 15 to the conditions of readiness for the next main power interruption. Those conditions are that the detector 26 through the buss controllers 24 and 25 and the power switching controller 28 isolate the independent power supply 16 from supplying the busses 2 and 3 and, where compatible, use power through at least one of those busses to recharge the independent power supply batteries.

In accordance with the invention the structure is compatible with the standard subassembly arrangement of computing apparatus and taking as a preferred embodiment the Personal Computer type of construction called the IBM XT manufactured by the IBM (TM) Corporation, where there are subassembly cards each having electrical connection arrangements on one edge and having the components mounted on main area of the card. The independent power and sensing portions of the invention are mountable on a single one of such cards.

Figure 4:
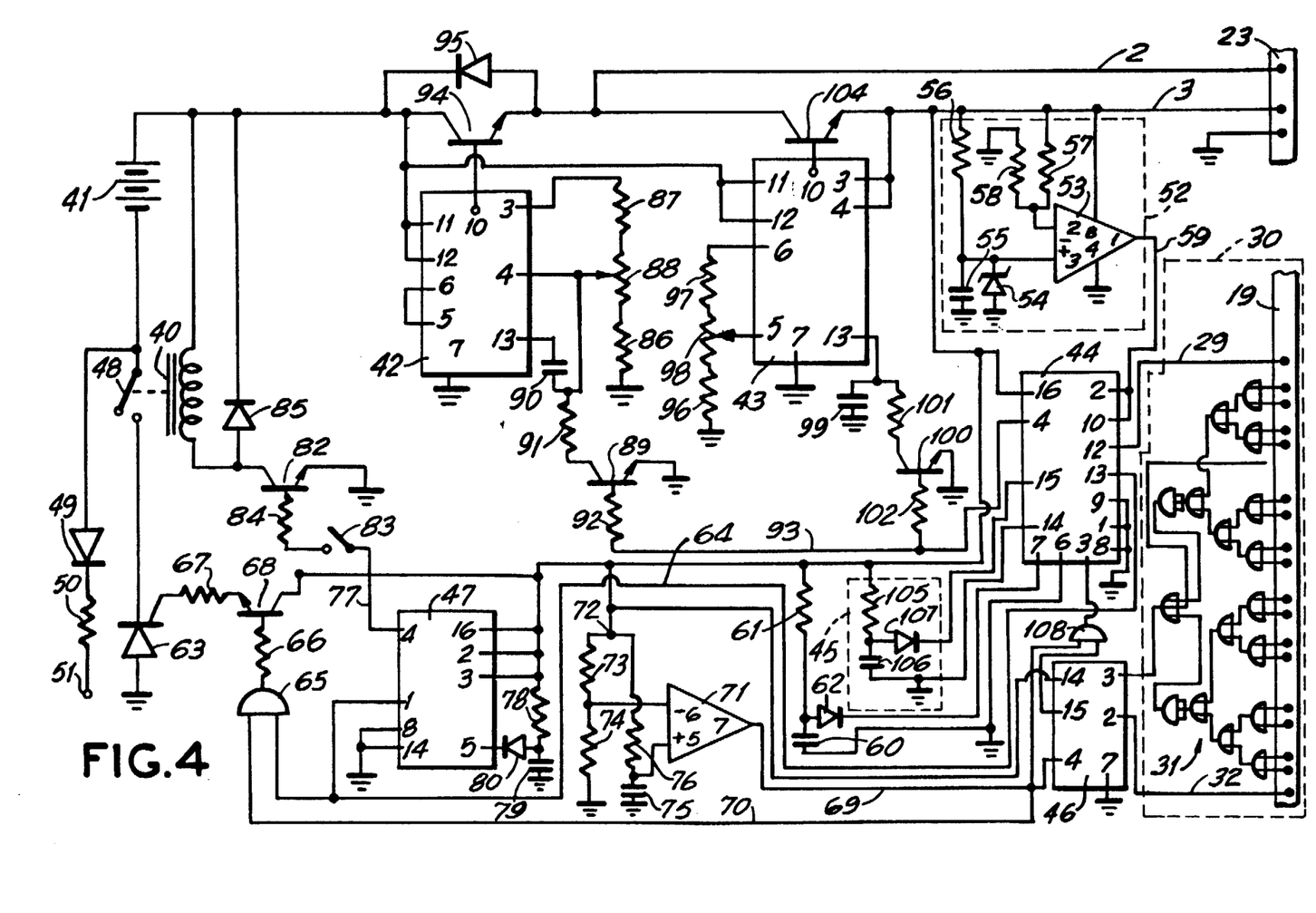
FIG. 4 is a circuit diagram of a computer subassembly with the sensor and independent power supply capabilities.

Referring next to FIG. 4 a circuit is provided for implementing the functions of the sensor 1 and the independent power supply 4 of FIG. 1 as organized in the diagram of FIG. 3.

In the circuit of FIG. 4 standard integrated circuit components known in the art are employed with individual terminals thereon shown by number in FIG. 4. The components are listed by element number and designation in the art in Table 1.

In FIG. 4 the twelve volt power bus is labelled element 2 and the five volt power bus is labelled element 3. The power connector 23 also includes a ground connection not labelled. The information channel to the computer is element 19 with the interrupt signal delivered on conductor 29. Information back from the computer on data channel 19 is received through conductor 32 located in the data connector interface 30 including the address decoder 31 made up of a series gate array standard in the art.

In the circuit of FIG. 4, in general, an electro mechanical switch such as a relay 40 is actuated on the detection of the voltage being low on the five volt power bus 3. This permits the independent power source 41 to provide the power which is regulated in elements 42 and 43 respectively. A detector circuit 44 is provided that determines the presence of a power interruption and provides signals to both the electromechanical switch to provide independent power and at the same time sends a signal on conductor 29 to the computer indicating a power interruption and setting up providing the special instructions needed for orderly power down of the system. A timing circuit 45 is provided that controls the providing of the independent power for a certain period of time of the order of 2 minutes.

When a signal is received from the computer on line 32 that indicates that the special orderly powering down instructions have been executed and that storage of information has taken place, or, that the main power has been restored, circuitry in elements 46 and 47 are provided to shut off the independent source of power 41 and to reestablish a standby condition.

The actual circuit elements will be described in connection with the operation.

The circuit under normal operating conditions receives a correct level 5 volts DC supplied by the main power supply and under these conditions the circuitry operates to charge the batteries making up the independent power supply 41, since the points 48 of relay 40 are normally open and current flows through diode 49 and resistor 50 in series to terminal 51 connected to a suitable negative source such as minus 12 volts. When a power failure is detected and the 5 volt supply on bus 3 drops below a selected voltage, for example 4.7 volts DC, the detection of the occurrence of a power failure is accomplished in a section labelled 52 in which an operational amplifier 53 is connected to serve as a voltage comparator wherein voltages are compared with a reference voltage by Zener diode 54, capacitor 55 and resistor 56 and compared with a plus 5 voltage from bus 3 and divided by two resistors 57 and 58. With this arrangement a signal is provided on conductor 59 when the voltage reaches 4.7 volts.

The signal on conductor 59 is supplied to the detector 44 which is an integrated circuit element having as one of its internal functions a pulse generator known in the art as a single shot multi vibrator. The single shot multi vibrator in detector integrated circuit 44 has its pulse characteristics determined by capacitor 60 resistor 61 with the DC performance controlled by diode 62.

Simultaneously with the generation of the signal indicating that there is a power interrupt on line 29 a silicon controlled rectifier 63 is turned "on" so that the batteries in power source 41 can supply power to the buses 2 and 3. The silicon controlled rectifier 63 is in turn controlled from element 44 through a conductor 64 and a gate 65 and through series resistors 66 and 67 which permit a transistor 68 to provide sufficiently amplified current to turn on the silicon controlled rectifier 63.

The gate 65 is rendered in an enabling condition in the following manner. When the power is up on the computer the processor thereof generates an output signal to the dedicated port to which the unit is connected. In the preferred embodiment of the personal computer equipment of the IBM (TM) Corporation that port is known as 0010H. When that output signal takes place it is decoded in decoding element 31 and a signal is provided to element 46 which is a standard integrated circuit containing a flip flop that delivers either a data bit zero or a data bit one. The flip flop serves to provide an enable condition when a data bit one signal is delivered by conductors 69 and 70 to enable gate 65. In the absence of a signal from the processor, the flip flop output would deliver a zero, and the batteries 41 would be connected to supply power.

Under conditions when the computer is under normal power, a reset level monitor amplifier 71 is provided that compares a voltage established between the +5 bus at terminal 72 at the point between resistors 73 and 74 connected to ground, and the voltage in an RC circuit between capacitor 75 and resistor 76, this gives a short term voltage that enables gate 108 and resets all circuits to the normal "power on" or "standby" state.

Simultaneous with the generation of a signal on conductor 29 signaling a power interruption the signal pulse from element 44 on conductor 64 is conducted into another integrated circuit labelled element 47 which has an internal flip flop that provides a pulse on line 77 the width of which is set by the resistor 78 capacitor, 79 diode so combination. The pulse from element 47 on line 77 operates to turn off relay 40 sufficient to drop out the points 48. Thus, the processor of the computer when successfully finished saving all the information through channel 19 turns relay 40 off which disconnects the independent power 41 to the computer and resets the circuits to standby. Under these circumstances transistor 82 only provides the necessary current to hold the relay 40 so that the pulse from element 47 delivered on line 77 can turn it off. In the line 77 between element 47 and the relay 40 is a manual switch 83 and a current control resistor 84 to prevent any pulse from passing to the relay when a manual override is desired. A diode 85 is connected in parallel with the relay 40 between the collector of the transistor 81 and the bus 2 to prevent an inductive surge on the bus.

The batteries 41 provide power for the short time needed for the orderly down powering of the equipment. In most applications, sixteen unregulated volts delivered for two minutes is adequate.

The regulator element 42 regulates the twelve volt bus output. The regulator is controlled by a resistor 86 and a resistor 87 connected to ground with a potentiometer 88 connected to a point between them. A low voltage is applied at a separate input to element 42 through transistor 89 and capacitor 90 with series resistor 91 and base resistor 92. Under these conditions at the time an interrupt signal is delivered through line 29 a signal is also delivered to transistor 89 on line 93 which operates to shut down the regulator 42.

In series with the twelve volt bus line 2 is a power transistor 94 having between the emitter and collector thereof a diode 95 which permits current to pass during the charging of the batteries 41.

The five volt regulator element 43 is controlled by resistors 96 and 97 with potentiometer 98 connected between them, and by capacitor 99 transistor 100 collector series resistance 101 and base series resistance 102 connected to element 44 so that the regulation function of element 43 can be terminated when the return signal from the computer on channel 19 returns the subassembly equipment to standby.

Across the regulator 43 is a power transistor 104 for the 5 volt buss 3.

The duration of the time that power is supplied, upon detection of a power interrupt, and the return to standby after orderly powering down, is governed by the RC circuit in element 45 made up of resistor 105 capacitor 106 and diode 107 which have a time constant selected for the time necessary to generate and have the computer execute the special orderly power down instructions.

In Table 1, there is provided for the circuit of FIG. 4 a listing of the components by reference number and standard designation in the art.

TABLE 1

| | |
|---|---|
| RELAY 40 | SPST TYPE 10 Amp relay |
| POWER BATTERIES 41 | 12 × 1.2 Volts NiCad 4 A.H |
| I.CIRCUIT 42 | IC Regulator LM723 |

TABLE 1-continued

| | |
|---|---|
| I.CIRCUIT 43 | IC Regulator LM723 |
| I.CIRCUIT 44 | Pulse Generator 774LS123 |
| I.CIRCUIT 46 | Flip Flop 7474 or 44LS74 |
| I.CIRCUIT 47 | Pulse Generator 774LS123 |
| DIODE 49 | Diode 1N4001 |
| RESISTOR 50 | 100 Ohm/2 W |
| OP. AMPLIFIER 53 | OP. Amplifier LM358 |
| ZENER DIODE 54 | Zener Diode LM336 |
| CAPACITOR 55 | Capacitor 0.1 uF |
| RESISTOR 56 | Resistor 47K, ¼ W 5% |
| RESISTOR 57 | Resistor 8.2K, ¼ W 1% |
| RESISTOR 58 | Resistor 6.8K, ¼ W 1% |
| CAPACITOR 60 | Capacitor 0.1 uF |
| RESISTOR 61 | Resistor 10K, ¼ W 5% |
| DIODE 62 | Switching diode 1N916 |
| SCR 63 | SCR ECG5521 |
| I.CIRCUIT 65 | Gate 7408 or 74LS08 |
| RESISTOR 66 | Resistor 10K, ¼ W 5% |
| RESISTOR 67 | Resistor 2,2K, ¼ W 5% |
| TRANSISTOR 68 | Transistor 2N2222 |
| I.CIRCUIT 71 | Operational Amp, LM358 |
| RESISTOR 73 | Resistor 33K, ¼ W 5% |
| RESISTOR 74 | Resistor 100K, ¼ W 5% |
| CAPACITOR 75 | Capacitor 1 uF |
| RESISTOR 76 | Resistor 100K, ¼ W 5% |
| RESISTOR 78 | Resistor 220K, ¼ W 5% |
| CAPACITOR 79 | Capacitor 1 uF, electrolytic |
| DIODE 80 | Switching diode 1N916 |
| TRANSISTOR 82 | Transistor 2N2222 |
| SWITCH 83 | ON/OFF switch 5 Amp |
| RESISTOR 84 | Resistor 10K, ¼ W 5% |
| DIODE 85 | Diode 1N4001 |
| RESISTOR 86 | Resistor 3K, ¼ W 5% |
| RESISTOR 87 | Resistor 2K, ¼ W 5% |
| POTENTIOMETER 88 | Multi-turn 1K POT. |
| TRANSISTOR 89 | Transistor 2N3904 |
| CAPACITOR 90 | Capacitor 1 uF |
| RESISTOR 91 | Resistor 2K, ¼ W 5% |
| RESISTOR 92 | Resistor 2K, ¼ W 5% |
| TRANSISTOR 94 | Power-Transistor 2N3055 |
| DIODE 95 | Diode 1N4001 |
| RESISTOR 96 | Resistor 2.2K, ¼ W 5% |
| RESISTOR 97 | Resistor 750 Ohm, ¼ W 5% |
| POTENTIOMETER 98 | Multi-Turn 500 Ohm POT. |
| CAPACITOR 99 | Capacitor 1 uF |
| TRANSISTOR 100 | Transistor 2N3904 |
| RESISTOR 101 | Resistor 2K, ¼ W 5% |
| RESISTOR 102 | Resistor 2K, ¼ W 5% |
| TRANSISTOR 104 | Power Transistor 2N3055 |
| RESISTOR 105 | Resistor 1M Ohm, ¼ W 1% |
| CAPACITOR 106 | Capacitor 47 uF, electrolitic |
| DIODE 107 | Diode 1N916 |
| I.CIRCUIT 109 | Gate 7408 or 741S08 |

In accordance with the invention the interdependent relationship of the sensing capability, the special austere powering down instructions and an independent source of power permits the entire capability to be arranged in compatible relationship with the standard subassembly type construction used of the computer with which it is to be operated.

Figure 5:
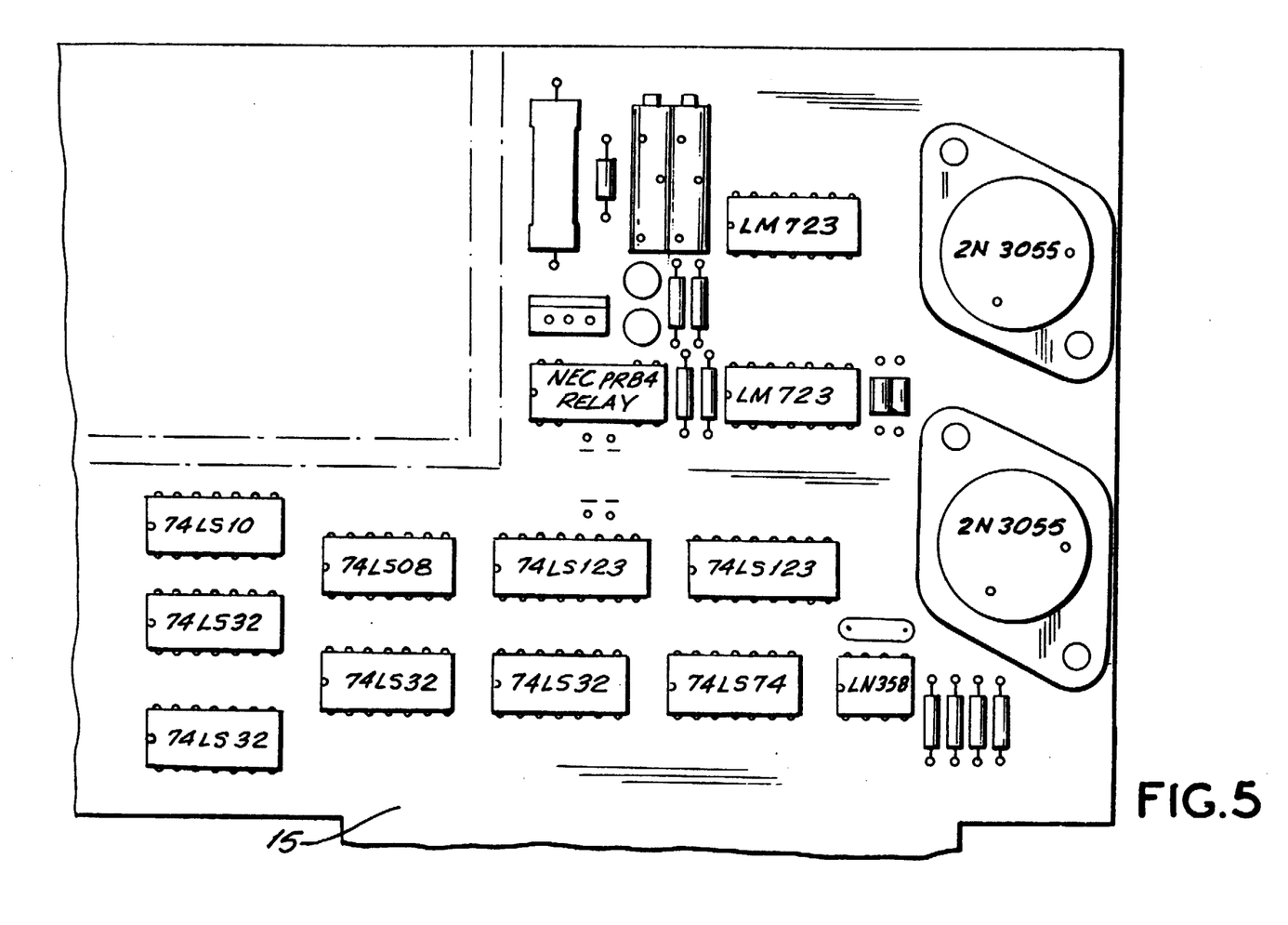
FIG. 5 is a schematic card type subassembly component layout of the portion of the components of FIG. 4.
Figure 6:
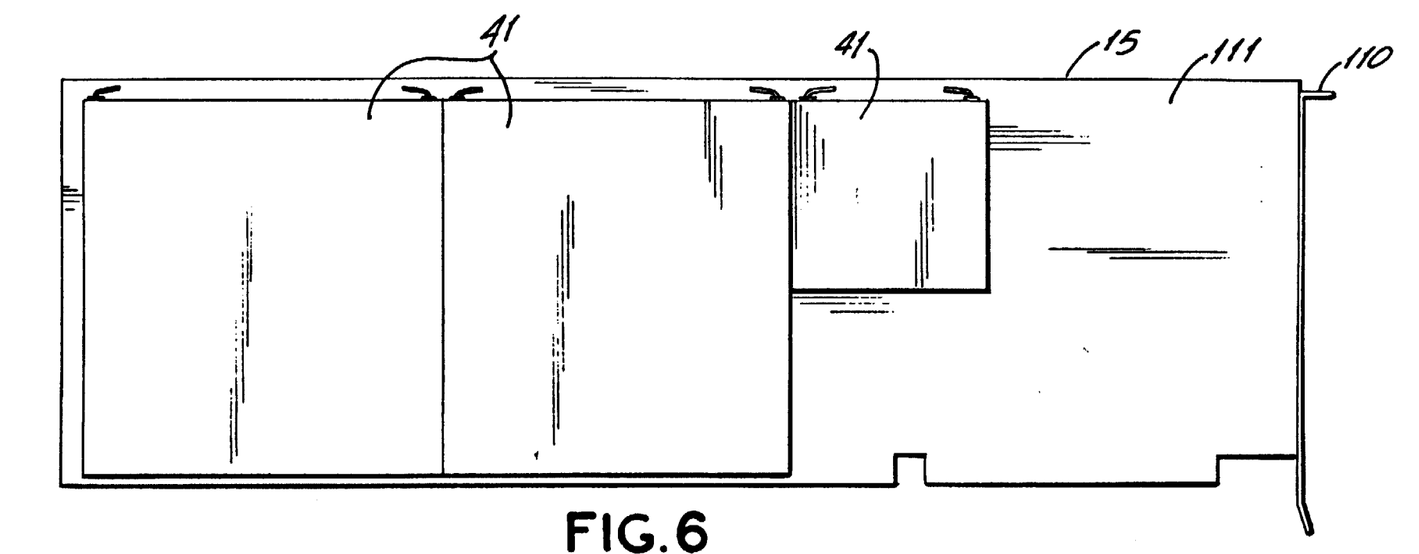
FIGS. 6 and 7 are plan and profile schematic views respectively, illustrating component layout on a card type subassembly.
Figure 7:
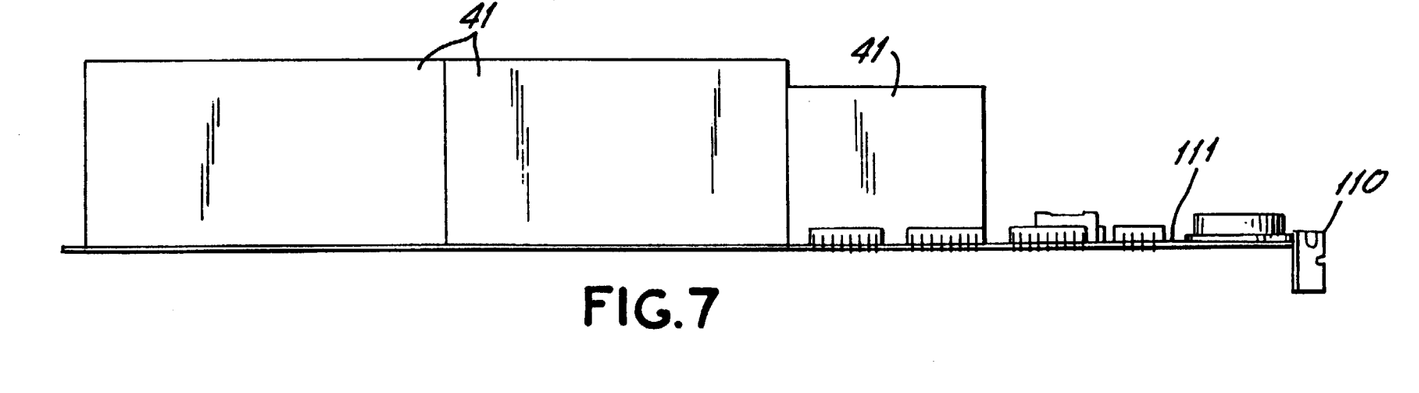

Following the preferred illustration of the type of construction employed in the personal computers of the IBM (TM) Corporation wherein there are a number of pluggable cards that hold the components the majority of the components of the circuit of FIG. 4 are shown on a portion of a card type subassembly in FIG. 5 with a schematic plan view of the overall card in FIG. 6 and a schematic profile view in FIG. 7.

Referring to FIG. 5, an example layout of the majority of the components of FIG. 4 is listed in Table 1, are shown positioned on a portion of a subassembly card which corresponds to element 15 in FIG. 2. The layout for wiring simplification generally positions the active and passive components in the vicinity of the connector of the card and positions the physically larger but with less interrelated wiring such as the batteries at a point more remote from the connector.

Referring to FIG. 6 using a smaller scale than FIG. 5 the larger components, in this example the batteries 41 are shown occupying the region of the card 15 remote from the connector portion 110 with the region 111 shown unoccupied in this view available for the more densely wired components.

Referring next to FIG. 7 also to a smaller scale than FIG. 5, there is shown a schematic profile view of both the larger components and of the more densely wired components, in which the batteries 41 occupy the more remote position from the connecting region 110 and the more densely wired components occupy the region 111 adjacent the connecting region 110.

It will be apparent to one skilled in the art consistent with the principles of the invention that there will be substantial flexibility in component and function arrangement.

As discussed in connection with FIG. 1 the invention involves the interaction of three capabilities. A power interrupt sensing capability, an independent source of power and a special austere source of instructions that will execute the orderly powering down of the equipment.

The special austere source of instructions that will execute the orderly powering down of the equipment is a subject of substantial flexibility within the principles of the invention. It is important that the system be able to get to the most efficient set of instructions that will preserve the work in progress or terminate any external interface with an indication that the event has taken place. As was discussed previously in the specification, there are cases so simple that only two instructions are involved, and there will be cases of extreme complexity. In general, the instructions are such that the user interface is bypassed and mainly the material in progress or the termination of an interface is accomplished in as few steps as possible. As was described there are instances where you are working on the updating or changing of a piece of text and the austere powering down instructions would merely be to take the work in progress and write right over the text passage already present in the permanent memory. Then there would be more complicated cases where portions of work in progress would be located in various buffers or on auxiliary disc drives that would have to be assembled and then written at an address in the permanent memory, always with an indication to the person who takes up the equipment at a later date that this event has taken place so that the state of the intermediate work in progress can be properly assessed by the subsequent user.

The source of instructions can be placed anywhere within reach during the time frame of the independent power source, but for purposes of illustration of the preferred embodiment where the instructions are in the program already present, there are several approaches to this technique. One is to have the manufacturer of the program place the instructions in the program. The other is to have the system add the instructions when the program is placed in the library. Where the manufacturer places the instructions in the program, when it is supplied and put in the library, the system merely addresses those instructions and they are executed forthwith. Where the system is to test various programs and to introduce the proper instructions, FIGS. 8–11 are provided to illustrate the management of this type of operation.

In FIGS. 8 to 11 there is shown an illustrative set of program flow charts which can be employed in order to produce the special austere instruction sets for programs that are in the library of the machine and for testing other programs so that the needed instructions will be available when placed in the machine library.

Figure 8:
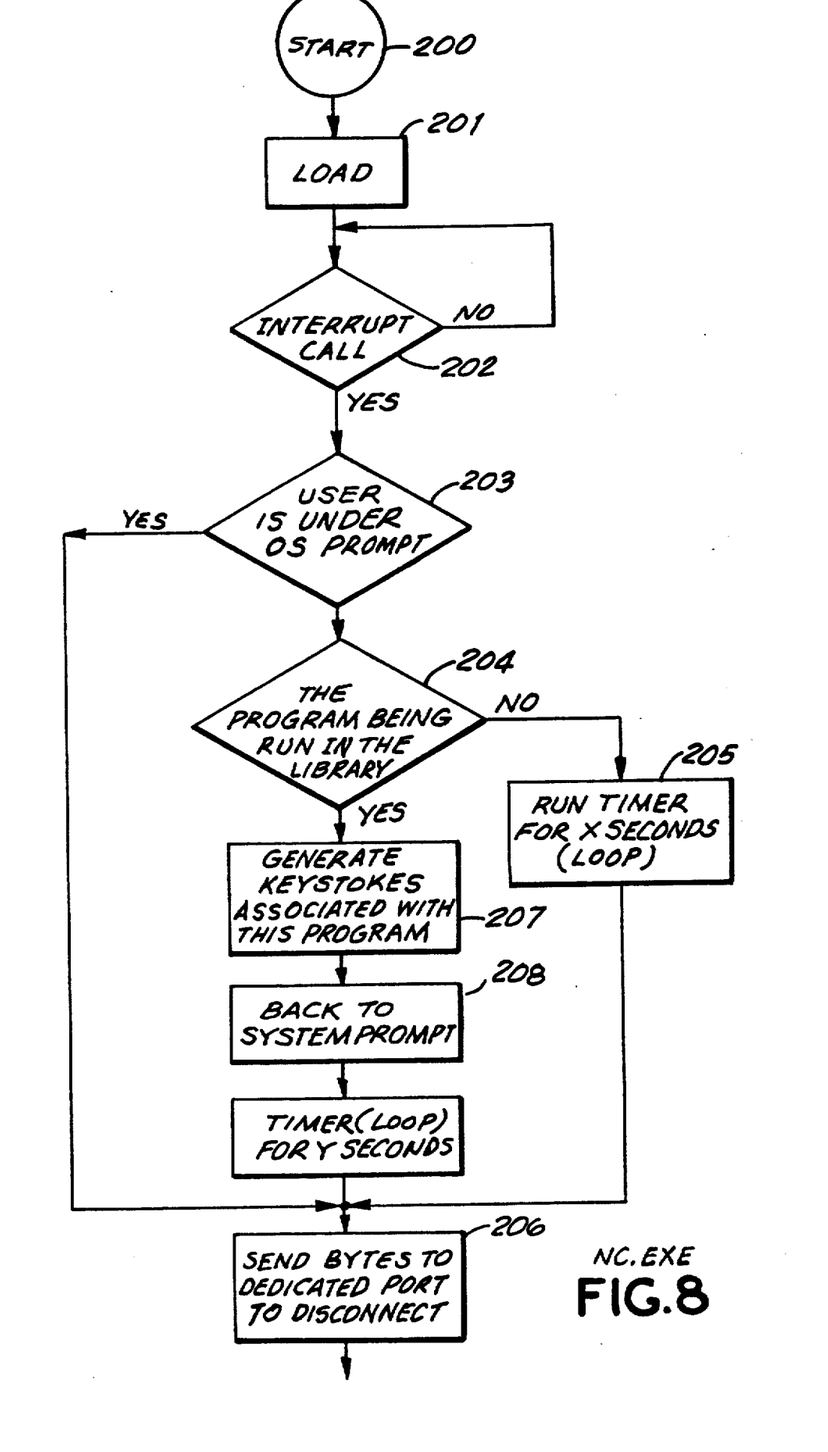
FIG. 8 is a schematic flow chart of a set of instructions for duplicating the manual key strokes that would be used in orderly powering down or signing off.
Figure 9:
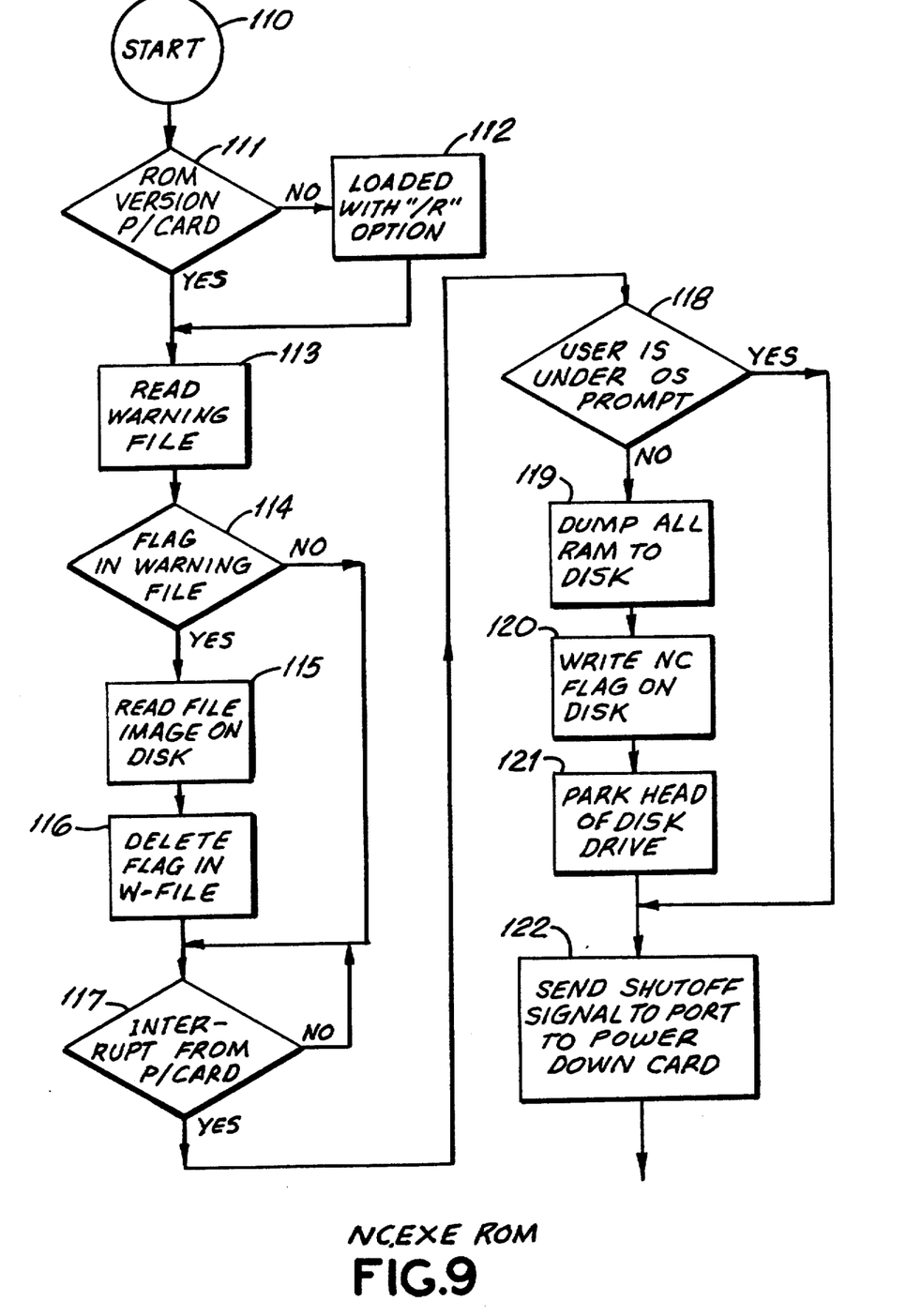
FIG. 9 is a schematic flow chart of a set of instructions in an orderly powering down for transferring internal work in process to permanent memory.
Figure 10:
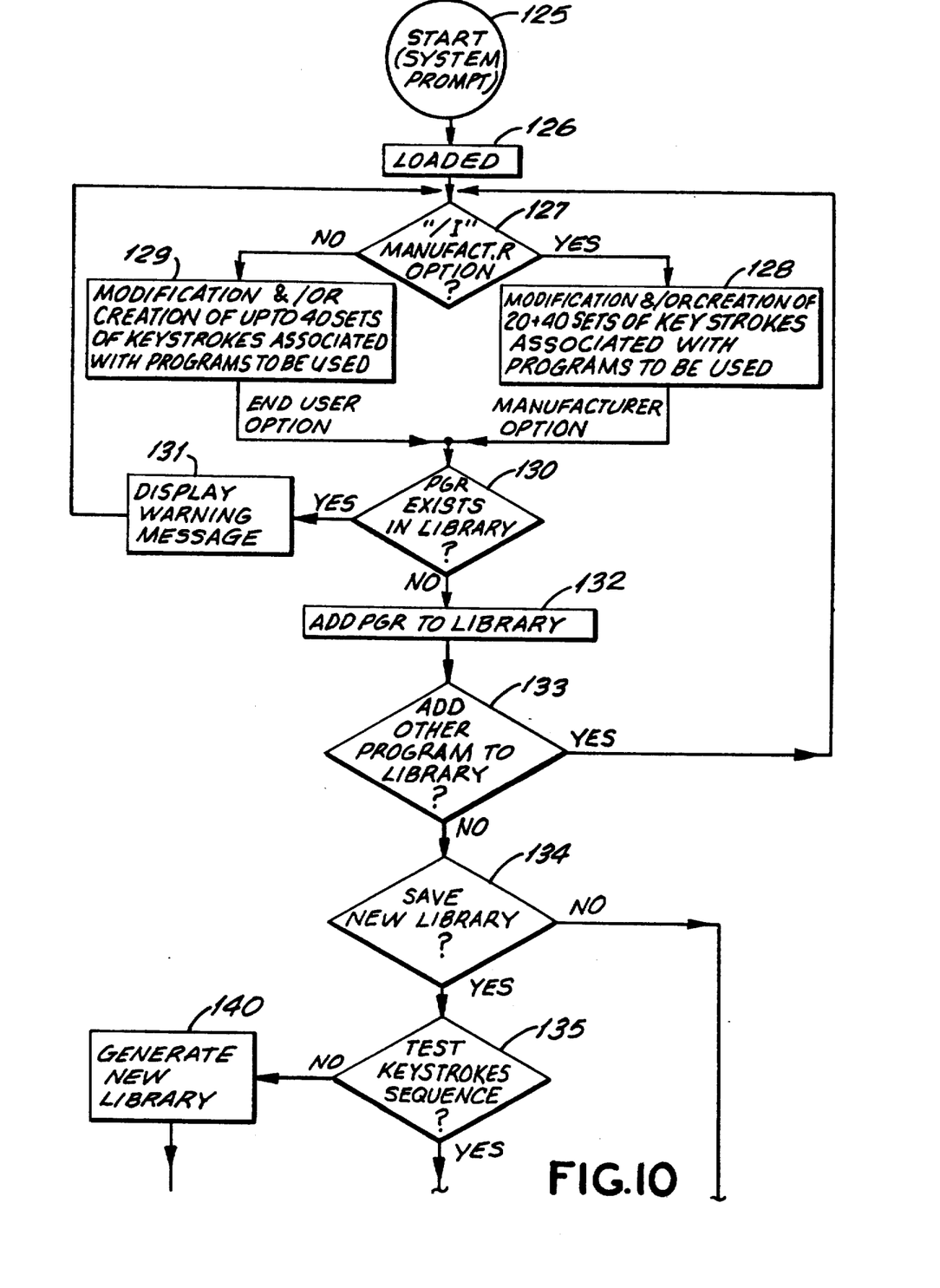
FIG. 10 is a schematic flow chart of a set of instructions that permits the recognition and update of the library of keystrokes used by the program described in FIG. 8.
Figure 10A:
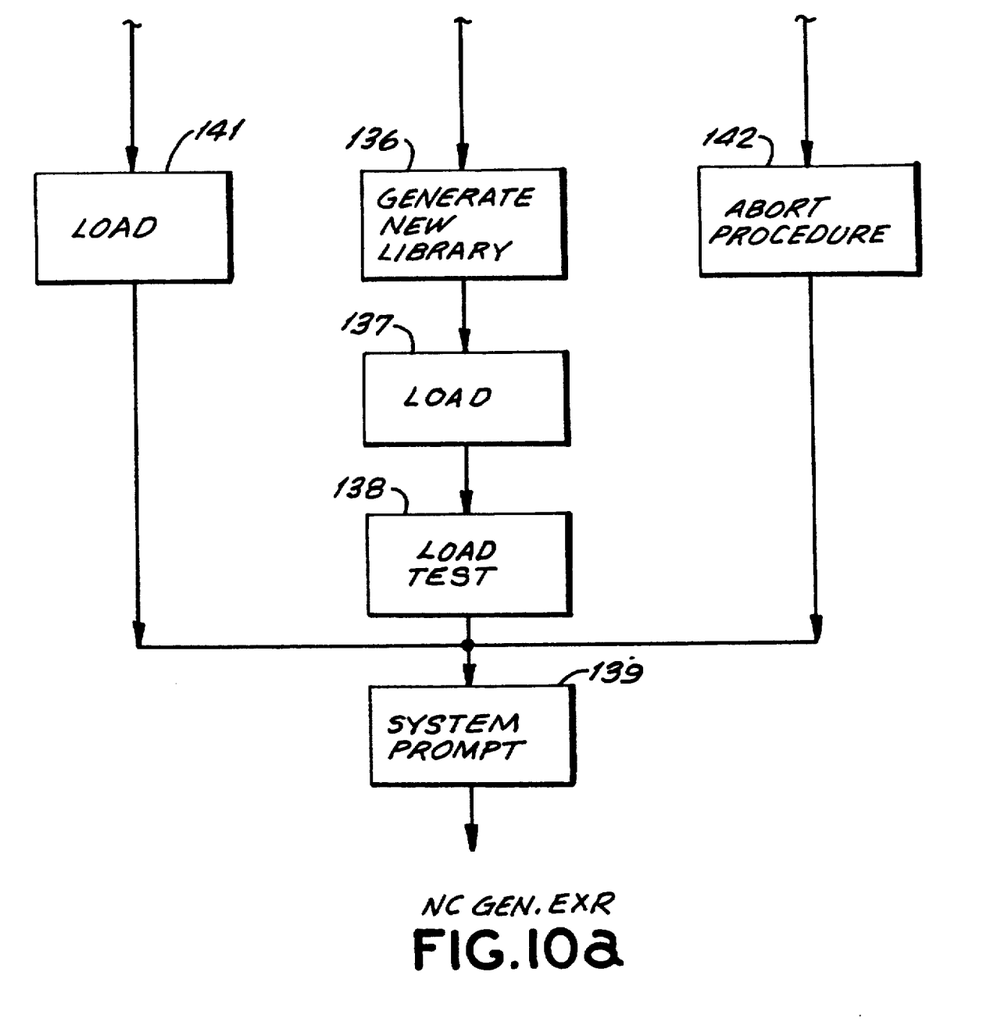
Figure 11:
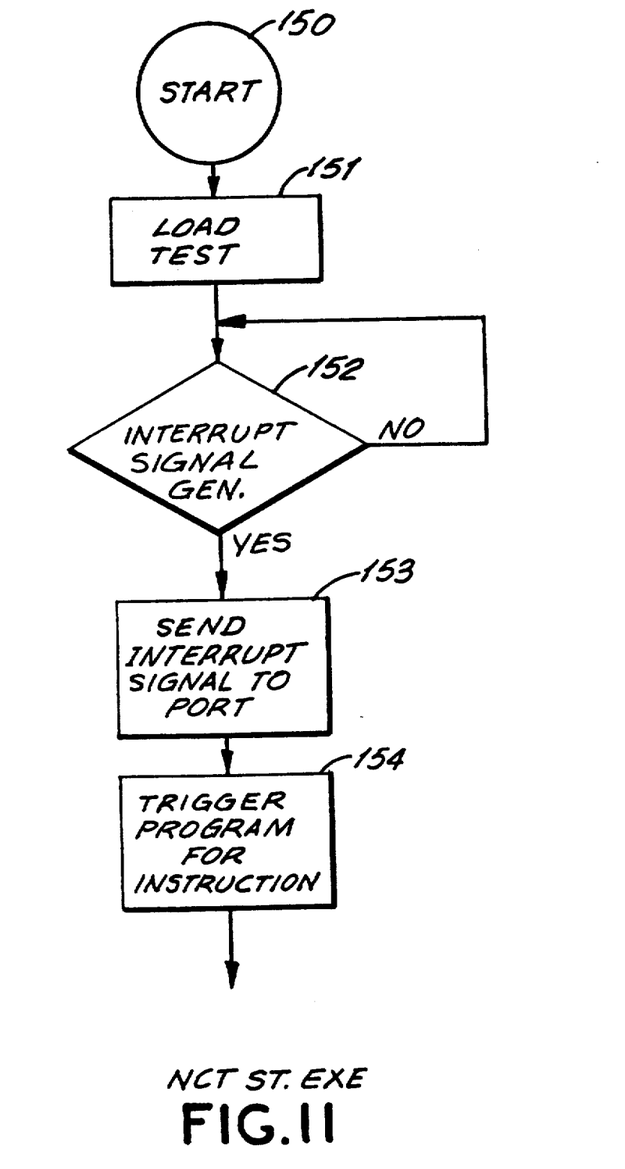
FIG. 11 is a schematic flow chart of a set of instructions for testing through software the program described in FIG. 8 which could have been updated through the program described in FIG. 10.

In FIG. 8 NC.EXE a functional flow chart is shown of a program that will arrange the generation of the equivalent of manual keystroke signals that will orderly power down the equipment. FIG. 9 NC.EXE ROM is a functional flow chart for producing the instructions that will transfer the content of a random access memory, all the different registers, and the I/O ports status to permanent memory. In FIG. 10 NCGEN.EXE there is provided a schematic flow chart of a set of instructions that permits the recognition and update of the collection of keystrokes used by the program described in FIG. 8. The program in the schematic flow chart of FIG. 10 will build a new version of the program of FIG. 8 that will act when it receives the interrupt signal from the sensor and will provide the special orderly powering down instructions. It may be used in two ways. The user can employ it to add new programs. The system can also use it to test programs that are already in the machine library. In FIG. 11 NCTST.EXE a functional flow chart is provided for testing a program that is to be added to the library.

Referring first to the keystroke generation program illustrated in FIG. 8. The program begins at location 200 and in location 201 the program is loaded. At location 202 there is a test for the presence of a power interrupt signal from either line 29 in FIGS. 3 or 4 or from the program to be described in connection with FIG. 11 for a program to be added to the library.

At location 202 where no interrupt signal is present no further action takes place.

On the other hand where there is an interrupt signal, at location 203 a test is made to see if the operating system (OS) for the particular piece of equipment is under normal prompt condition. If it is under normal prompt condition, the system can be powered down and the remainder of the program is skipped so that the sensor and independent power supply subassembly of the the invention will be disconnected.

Where the operating system is not under a normal prompt status, the program in location 204 tests to see if the program that is being run on the machine has the powering down instructions "built in", in other words, either previously supplied or supplied by the manufacturer. If the instructions are not "built in", time is given at location 205 for giving some time to any process to be completed and a signal is sent at location 206 to disconnect the independent power supply of the invention.

If the instructions are built in, the equipment will generate the necessary instructions equivalent to manual keystrokes at location 207 for the orderly powering down followed by a return to OS system prompting in location 208 for a specific time in location 209, after which, the independent power supply subassembly of the invention will be disconnected.

As described previously the instructions equivalent to manual keystrokes of location 207 are a special austere series of simple instructions which operate to signoff or to take the material of work in process and the various subroutines in the buffers and store them all under a proper location in the main permanent memory with an indicator that the power interruption event took place.

Referring next to the RAM-IMAGE program illustrated in FIG. 9, a program will be described which operates to perform an orderly transfer of the contents of such items as auxiliary disc drives, random access memory, buffers as well as the different registers and the I/O status port into the permanent memory. With a start location 110, a test is made in location 111 to determine whether a special subassembly such as a card with the special instructions on it has been placed in the machine. If the instructions are not in a subassembly, then in location 112 a program is loaded and employed with the instructions. At location 113 the file is read to detect the presence of a flag indicating that the contents had been transferred when power was interrupted. If a flag is present, at location 114 the file image is read in 115 and the flag is deleted in location 116. On the other hand, if no flag is present the program skips to the point at location 117 where an interrupt signal from the subassembly of the invention on conductor 29 through channel 19 can be detected. If there is no interrupt signal a loop is generated. If on the other hand, there is an interrupt signal, in location 118 a test is made to see if the operating system for the machine is under prompt status. If it is not under a prompt status, then the entire contents of RAM, registers and I/O port status are transferred to the permanent memory in location 119 and new warning flag is written at location 120 indicating that the event had taken place. The heads on the disc drives are then placed in park position at location 121. At location 118 if the operating system is under normal prompt and the events in locations 119, 120 and 121 are skipped. In location 122, in both cases a signal is sent that disconnect the independent power supply subassembly of the invention.

In FIG. 10, a schematic flow chart is provided illustrating a set of instructions that permits the recognition and update of the library of instructions corresponding to manual keystrokes used by the program of FIG. 8, which acts on the interrupt signal and generates the necessary keystrokes.

Referring next to FIG. 10, in response to a prompt signal from the system in location 125 the set starts and in location 126 the program is loaded and a test is made in location 127 to see whether the program presently being run in the machine is one in which the manufacturer or supplier had placed the necessary special power down instructions or whether the special power down instructions were ones that have to be produced by the user. In the case of the situation involving the providing of the instructions by the manufacturer, in location 128, the necessary keystroke signals are present and can be modified by the manufacturer and in the case of location 129 those signals are provided and may be adapted by the user to run with any program that does not already have them. In location 130 a test is made to see if the program is one that is presently in the library of the machine with the necessary keystroke signals already present. If such is the case, a warning message is provided at the location 131 and the program cycles back to location 127. On the other hand, if the program is not in the library, and a desire to add it is established in 132 then the program is added in location 133, and, when it is, the program recycles back to location 127. If the program is not added to the library in location 133, in location 134, a test is made to see if the program should be saved for a new library. If the decision is yes in location 134, then the user will be asked if he wants to test the new library that was generated. If the decision is yes in location 135, then in location 136 a new library listing is assembled and in location 137 the updated keystroke generation program illustrated in FIG. 8 will be loaded, and in location 138 the testing program illustrated in FIG. 11 will be loaded to test the new keystrokes recently incorporated in location 139 the program will return to O.S. prompt.

Returning to location 135, if the test of the keystroke sequence is not acceptable, then in location 140 an updated new library listing of programs with orderly power down sequences is made up and is added in location 141.

Returning to location 134, if a decision is made at this point not to save for the new library there is an abort procedure in location 142 that bypasses to the system prompt at location 139.

In FIG. 11, there is a schematic flow chart of a set of instructions for testing through software the program described in FIG. 8 which could have been changed and updated through the program described in connection with FIG. 10. The program of FIG. 11 when loaded, generates a test interrupt signal, such as a NMI in the personal computer example under discussion, and would be generated through pressing the simultaneous strokes CTRL Alt Shift and send the signal to trigger the programs of FIGS. 8 or 9. Referring next to FIG. 11, the system prompt occurs at location 150 and with the program loaded in location 151, a test is made in location 152 as to whether the three simultaneous keystrokes control, alternate, and shift are being pressed. If they are not pressed, and the interrupt is not generated, a loop is generated. If they are being pressed an interrupt signal is sent in location 153 to the dedicated port in channel 19 which triggers the programs of of FIGS. 8 or 9 in location 154.

What has been described is an invention for the orderly powering down of a computer when there has been an interruption in the electric power supply. The invention involves a portion of the computer in a form of a subassembly carrying an independent source of power capable of supplying logic and power for a short period of time. A detector that determines that an interruption has taken place provides the source of power and generates the proper instructions for the orderly powering down of the device.

What is claimed is:

1. In a computer supplied by an electric power source and comprising at least an internal intermediate memory for retaining parts of a work in progress while it is operated on by the computer during various states of the computer and an internal permanent memory utilized by the computer to store completed parts of the work in progress through transfer along internal channels, both of which memories are used during normal computer operation, the improvement comprising:

an independent source of power, detecting means for indicating an interruption of energy supply from said electric power source, means for reserving memory address locations in said internal permanent memory, means for switching, in response to detection of said interruption, the independent source of power into operation in relation with said computer, means responsive to the detecting means for determining the state of the computer operating on the work in progress at the time of interruption, and means for providing special austere orderly powering down instructions to terminate external computer interfaces and to automatically transfer identically the state of the computer including all work in progress as it exists at the time of interruption to said reserved memory address locations in said internal permanent memory through the normally used internal channels with an indication in the computer of said interruption of said power source, said means for switching then disconnecting said independent source of power.

2. The improvement of claim 1 wherein said instructions bypass user interface operations.

3. The improvement of claim 1 wherein said power source and said detecting means are mounted on a subassembly of said computer and said means for providing said instructions is located in the internal permanent memory of said computer.

4. The improvement of claim 3 wherein said means for providing said instructions is formed to generate a series of signals that bypass user interface operations.

5. The improvement of claim 4 wherein said switching means includes a power switching controller and a separate controller for each bus of said computer.

6. The improvement of claim 5 wherein said detecting means includes a monitor of the power level on one bus of said computer and a power interrupt signal generator responsive to a signal from said monitor.

7. The improvement of claim 6 wherein said detecting means includes resetting means operative upon the restoration of power.

8. The improvement of claim 7 wherein said resetting means includes a reset level monitor and signal means to disable each said bus controller and to disconnect said independent source of power.

9. The improvement of claim 8 wherein said independent source of power is a battery.

10. The improvement of claim 8 wherein said battery is mounted remote from the detecting means in said subassembly.

* * * * *